United States Patent [19]

Bushnell

[11] 4,320,436

[45] Mar. 16, 1982

[54] SECONDARY VALVE ARRESTER

[75] Inventor: Joseph H. Bushnell, Olean, N.Y.

[73] Assignee: McGraw-Edison Company, Rolling Meadows, Ill.

[21] Appl. No.: 169,909

[22] Filed: Jul. 17, 1980

[51] Int. Cl.[3] .............................................. H02H 1/04

[52] U.S. Cl. ..................................... 361/128; 337/34; 361/127

[58] Field of Search ....................... 361/127, 128, 117; 337/34, 28, 29

[56] References Cited

U.S. PATENT DOCUMENTS 3,987,343 10/1976 Cunningham et al. ......... 361/127 X

FOREIGN PATENT DOCUMENTS 1106408 5/1961 Fed. Rep. of Germany ...... 361/127

1254229 11/1967 Fed. Rep. of Germany ...... 361/128

*Primary Examiner*—Reinhard J. Eisenzopf

*Attorney, Agent, or Firm*—Charles W. MacKinnon; Ronald J. LaPorte; Jon Carl Gealow

[57] ABSTRACT

A secondary valve arrester for protection of secondary electrical systems, comprises a housing having a lid and base portion, the latter of which includes a plurality of compartments each of which is dimensioned to receive a valve block and spark gap assembly or a varistor assembly; the number of said assemblies included in the arrester corresponding to the number of phases protected in the system. Each said assembly includes connecting electrodes of similar construction, each connecting electrode having two offset male terminals and one offset female terminal for connection to externally connected lead wires or other connecting electrodes. The housing lid includes first and second rib sets for extension into the base portion to retain the said assemblies in a tightly stacked condition in respective compartments. When used in a relatively low voltage system, the arrester includes said assemblies of a predetermined thickness and the housing lid is received on the base in a first orientation to position a first rib set into alignment with the said assemblies. When used in a relatively high voltage system, the arrester includes said assemblies of a greater thickness and the housing lid is rotated 180° such that a second, shorter rib set extends into respective compartments. Each said assembly also includes a spark gap electrode having a centrally located convex portion coated with a dielectric material to provide the arrester with an improved impulse spark over characteristic.

16 Claims, 12 Drawing Figures

FIG. 6
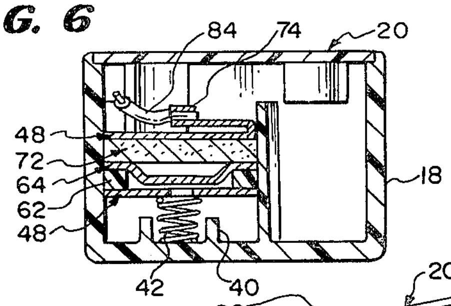
FIG. 7
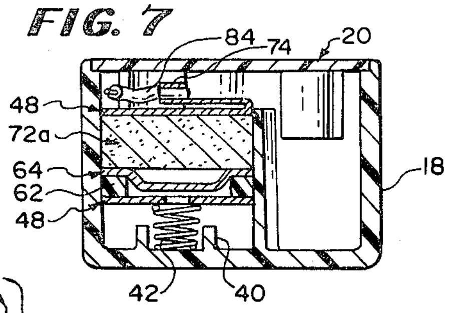
FIG. 8
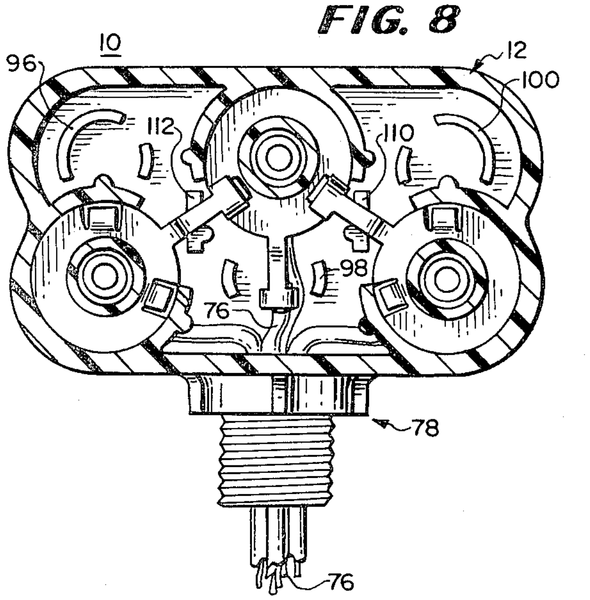
FIG. 9
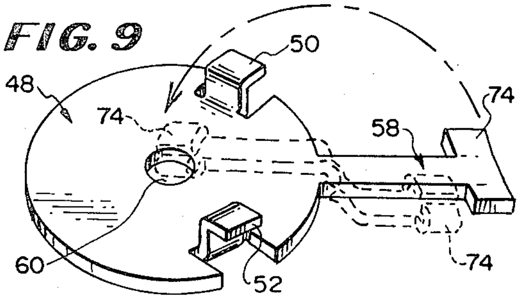
FIG. 10
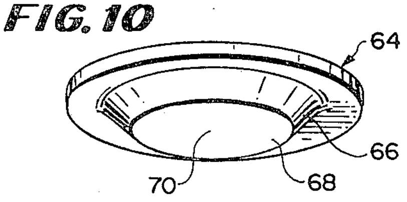
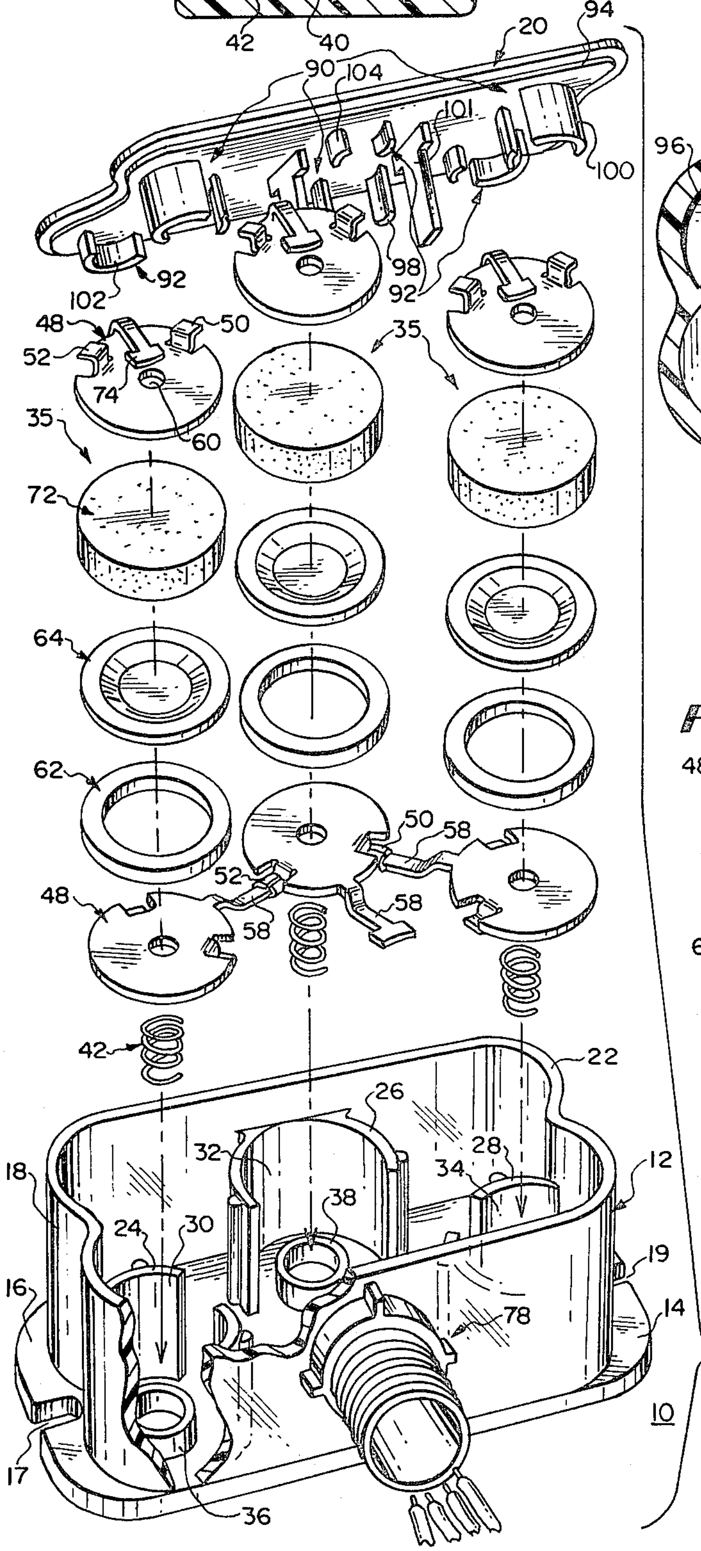
FIG. 11

SECONDARY VALVE ARRESTER

BACKGROUND OF THE INVENTION

This invention relates generally to surge arresters and more particularly to those arresters known as secondary valve arresters which employ a spark gap portion and a nonlinear resistive material or valve block portion in combination, for dissipating high voltage surges produced commonly by lightning.

In operation, the valve block portion of a secondary valve arrester displays a high resistance to voltages normally carried by the electrical system being protected by the arrester and has a low resistance to voltages in excess of normal system voltage. The spark gap portion of the arrester displays a near infinite resistance until a high voltage surge well in excess of normal system voltage, causes sparkover. Predetermined construction of the spark gap portion can be used to affect the voltage at which sparkover occurs. Accordingly a valve arrester properly constructed for a particular system voltage appears as an open circuit during normal operation and acts as a circuit path to ground during the application of high voltage surges, thereby avoiding damage caused by an overvoltage condition in the system.

It is desirable in valve arresters of the type described that the spark gap portion respond to impulse voltages as low as possible and yet not sparkover at normal system voltage for dissipating quickly high voltage surges which may occur in the system. This is commonly referred to in the art as displaying a good impulse sparkover voltage characteristic.

The provision of such a characteristic has been accomplished through the use of specially designed spark gaps in valve arresters. While these specially designed spark gaps provide the characteristic desired, they are quite elaborate in design and expensive to fabricate.

Valve arresters of the type described are commonly used in single, two and three phase electrical systems. In such cases, each phase of the system includes a spark gap and valve block assembly for protection of that phase. Furthermore, some arresters are constructed for relatively low voltage electrical systems; i.e. 250 volts, while others may be constructed for relatively high voltage electrical systems; i.e. 650 volts. To provide valve arresters for the various uses described normally requires a variety of different arrester embodiments, each comprising a variety of different components. Accordingly, the manufacture of valve arrester embodiments which meet all the requirements of the various electrical systems to be protected, can be costly and the storing of different types of valve arresters requires that a distributor of such arresters maintain a large inventory.

SUMMARY OF THE INVENTION

It is thus a primary object of the present invention to provide a new and improved valve arrester which has an improved impulse sparkover voltage characteristic and which can be quickly and inexpensively adapted for use in electrical systems of different voltage levels and having a different number of phases.

It is another object of the present invention to provide a valve arrester of the type described which is relatively simple in construction, has a minimum of parts, is relatively inexpensive to fabricate and operates rapidly to effectively dissipate lightning or the like high voltage surges applied to the system in which it is used.

Briefly, a preferred embodiment of a valve arrester according to the invention comprises a housing or case including a base portion having a base wall and a surrounding upstanding side wall. A lid or cover is received on the base portion and ultrasonically welded thereto to enclose the housing. The housing is divided by suitable upstanding interior walls or ribs into a plurality of compartments, dimensioned to receive a similar number of spark gap and valve block assemblies.

Each of the valve block and spark gap assemblies is stacked in one of the compartments of the housing, and includes a helical spring, two connecting electrodes, one on each end of the stack, a gap spacer element, a spark gap electrode and a suitable valve block. The spark gap electrode includes a centrally located, convex portion having a "button" coating of a dielectric material such as, for example, chromium oxide or aluminum oxide which provides the desired impulse sparkover voltage characteristic of the arrester.

Varistor assemblies may be used in place of the valve block and spark gap assemblies, each varistor assembly including a helical spring, and a suitable metal oxide varistor (MOV) situated between two connecting electrodes.

The connecting electrodes of the arrester according to the invention are of similar construction with each including two offset male tabs or terminals and an offset female tab or terminal. Either of the male tabs of the one electrode may be joined to the female tab of an adjacent electrode when the arrester is employed in a two or three phase electrical system. External connections to the spark gap and valve block assemblies are made by wire leads provided with male ends connected to the female tabs of the electrodes. The wire leads are introduced into the housing via an externally threaded conduit portion integrally formed with the side wall of the housing. Epoxy fills the conduit portion to seal the housing subsequent to locating the spark gap and valve block assemblies in their respective housing compartments.

If the arrester is to be used in a relatively low voltage electrical system, valve blocks of a predetermined thickness are included in the valve block and spark gap assemblies. In such case, the housing lid is received on the base portion in a first orientation. In this position, a first set of ribs formed on the lid and extending outwardly therefrom, are received in respective compartments to secure the stacked elements of the spark gap and valve block assemblies in position.

If the arrester is to be used in a relatively high voltage electrical system, valve blocks having a greater thickness are employed in the spark gap and valve block assembly, and the lid is rotated 180° prior to being received on the base portion of the housing, to align second, shorter ribs formed on the lid with the compartments for securing the higher stacked elements in position therein.

DESCRIPTION OF THE DRAWINGS

In the drawings:

FIG. 6 is a sectional view of the secondary valve arrester of FIG. 4, taken along the line 6—6 thereof illustrating a valve block and spark gap assembly employed in the arrester when the latter is in use in relatively low voltage electrical systems;

FIG. 7 is a sectional view similar to that of FIG. 6, illustrating a valve block and spark gap assembly employed in the arrester when the latter is for use in a relatively high voltage electrical system;

FIG. 8 is a sectional view of the secondary valve arrester of FIG. 4 taken along the line 8—8 thereof;

FIG. 9 is an enlarged perspective view of a connecting electrode employed in the secondary valve arrester according to the invention;

FIG. 10 is a perspective view of a spark gap electrode employed in the secondary valve arrester according to the invention; and FIG. 11 an is exploded perspective view of a preferred embodiment of a secondary valve arrester according to the invention.

DETAILED DESCRIPTION OF THE DRAWINGS

Figure 1:
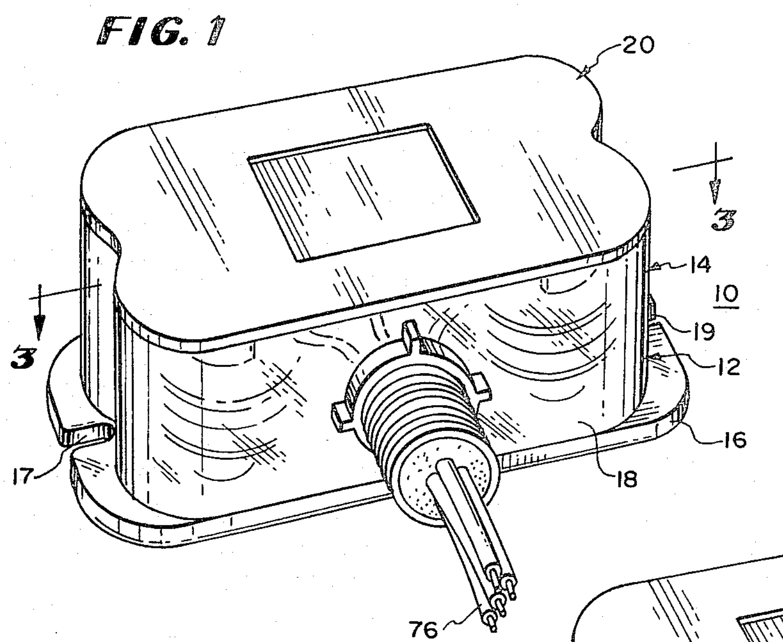
FIG. 1 is a perspective view of a preferred embodiment of a secondary valve arrester according to the invention.
Figure 2:
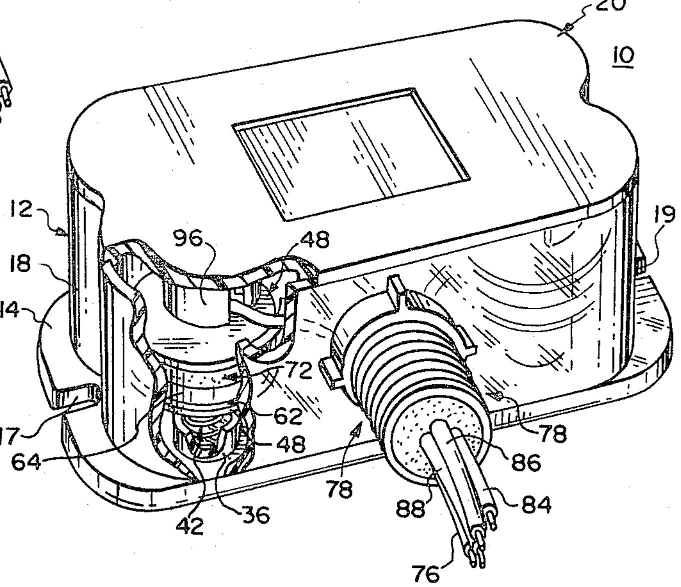
FIG. 2 is a partially cut-away, perspective view of the secondary valve arrester of FIG. 1.

Referring now to the drawings in greater detail wherein like numerals have been employed throughout the various views to designate similar components, there is illustrated in FIGS. 1-11 a preferred embodiment of a secondary valve arrester 10 according to the invention. Arrester 10 comprises an outer housing or case 12, preferably of molded plastic or similar insulative material.

Case 12 includes a base portion 14 comprising a base wall 16 and an upstanding predeterminedly shaped side wall 18 adjoining and extending upwardly from base wall 16. Opposite ends of the basewall extend outwardly beyond the side wall and define a pair of slots 17, 19, respectively, for receipt of fasteners used to mount the arrester on a support surface.

A lid or cover 20 is provided for receipt on base portion 14 to enclose case 12. In practice, the lid is ultrasonically welded onto free end 22 (FIG. 11) of the sidewall 18 of the base portion 14 after the internal components of the arrester have been assembled on the base portion.

Base portion 14 of the housing includes three sets of internal, upstanding ribs or walls, 24, 26, 28, respectively, which define three spaced internal compartments 30, 32, 34, respectively. Each of the compartments is dimensioned to receive a spark gap and valve block assembly 35 (FIG. 11) to be described hereinafter.

In the preferred embodiment of the valve arrester according to the invention, the walls of rib sets 24, 26, 28 are curved to define cylindrically shaped compartments 30, 32, 34, respectively.

Formed on base wall 16, concentrically with cylindrical compartments 30, 32 34, are smaller, cylindrically shaped receptacles 36, 38, 40, respectively, which are provided for receiving and positioning helical springs 42, included as a part of valve block and spark gap assemblies 35.

Each of the valve block and spark gap assemblies employed in the valve arrester according to the invention is of similar construction. Accordingly, only one valve block and spark gap assembly will be described and similar numerals will be used to identify the components of the other valve block and spark gap assemblies illustrated. Each valve block and spark gap assembly 35 comprises a plurality of stacked elements including helical spring 42 received in a corresponding cylindrical receptacle 36, 38, 40, of the base portion of the housing. Positioned in engagement with helical spring 42 is a first connecting electrode 48. The connecting electrode is of metallic construction and circular in shape, dimensioned for receipt in any of the compartments 30, 32, 34, respectively. The electrode includes two offset male terminals 50, 52, and a female terminal 58 (FIG. 9). A central aperture 60 is defined in the electrode for gas dissipation during operation of the arrester.

Stacked above the first connecting electrode is a gap spacer element 62. Element 62 is ring shaped and formed of insulative material. The spacer serves in a conventional capacity to predeterminedly separate the first connecting electrode from a circular spark gap electrode 64 positioned on the opposite side of the spacer element.

Spark gap electrode 64 is a "button" type electrode having a central convex portion 66 (FIG. 10) dimensioned for receipt in the central opening of the ring shaped gap spacer element 62. Bonded to the outer surface 68 of button electrode 64 is dielectric material 70, such as, for example chromium or aluminum oxide. The dielectric material provides the spark gap assembly with an improved impulse spark over voltage characteristic. Sparkover of the gap permits the valve block 72 positioned on the button electrode as illustrated in FIG. 11, to rapidly dissipate high voltage surges occurring in the electrical system protected by the arrester. The dielectric material creates unequal voltage stresses within the spark gap and pre-ionizes the air about it, resulting in a lower arc over voltage in response to the application of a high voltage surge such as, for example, by lightning.

Valve block 72 is comprised of conventional semiconductor material, being either of metal oxide or silicon carbide composition which changes resistive state in accordance with increases and decreases in voltage applied thereacross.

A second connecting electrode 48, identical to the first connecting electrode, is positioned at the top of the stack of elements as viewed in FIG. 11, to complete the electrical path through the valve block and spark gap assembly.

It will be noted that the first connecting electrodes of the three valve block and spark gap assemblies illustrated in the preferred embodiment of the secondary valve arrester are connected together. The female terminals 58 of the electrodes received in end compartments 30, 34 extend outwardly from the electrodes and are joined with the two offset male terminals 50, 52 of the first connecting electrode received in central compartment 32. Connection of the female terminals to the male terminals is made as illustrated in FIG. 9, wherein the free end 74 of female terminal 58 is bent to form a sleeve shown in dotted lines into which the male terminal is inserted. The interconnected electrodes connect the valve block and spark gap assemblies to ground potential. The arrester illustrated in the drawings including three valve block and spark gap assemblies is employed for protecting a three phase electrical system for lightning surges.

In the case of a single phase line, such as, for example, a simple lighting circuit, only a single valve block and a spark gap assembly is employed. In such case, only single first and second connecting electrodes are required and the valve block and spark gap assembly is positioned in the central housing compartment 32. If two phase protection is needed, such as, for example, in a residential service box, the central compartment 32 and one of the outer compartments 30, 34, respectively, receives a valve block and spark gap assembly. In such case, the first connecting electrodes of the assemblies in the outer and central compartments are interconnected as described heretofore.

If a three phase electrical system, such as, for example, a three phase motor system, commonly used in industry, is to be protected, all of the three compartments 30, 32, 34, respectively, are equipped with valve block and spark gap assemblies and interconnected as illustrated in the figures of the drawings.

In the case of the interconnected first electrodes a single wire lead 76, is connected to the outwardly extending female terminal 58 of the central, first connecting electrodes. The lead 76 extends outwardly of the housing via an externally threaded conduit 78 formed intergrally with side wall 18 of the housing base portion. The external thread on the conduit is provided for connection to a shielded conduit for protecting the wire leads externally of the arrester. The end of the wire lead 76 connected to the female terminal is tined with solder to provide rigidity and is received in the crimped female terminal end 74.

Figure 4:
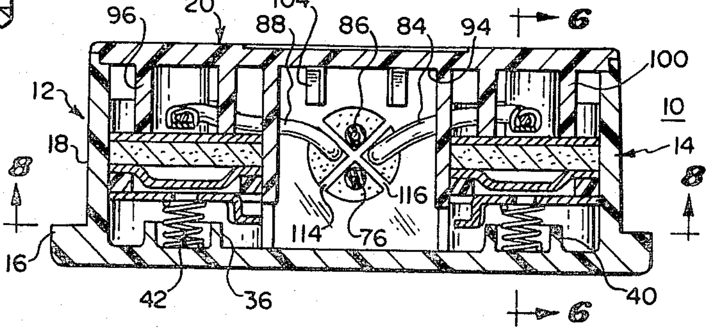
FIG. 4 is a sectional view of the secondary valve arrester of FIG. 3 taken along the line 4—4 thereof.
Figure 5:
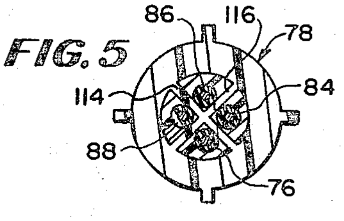
FIGS. 5 and 5a are sectional views of the secondary valve arrester of FIG. 3 taken along the line 5—5 thereof.
Figure 5A:
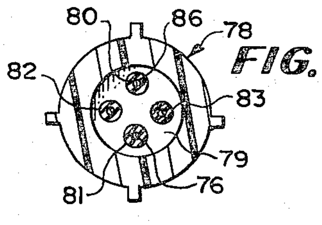

Conduit 78 includes internally formed crossribs 114, 116, FIG. 4 and 5, which divide the conduit into four passages, one for each of the four leads which may be used with the valve arrester according to the invention. An alternative conduit 78 fabrication includes an internal structure 79, FIG. 5*a,* which forms two lead holes 80, 81 and two knockout diaphrams 82, 83 which can be easily pushed through to form additional lead holes for additional lead wires as needed, each lead hole accommodating one lead wire which may be used in the valve arrester according to the invention.

Figure 3:
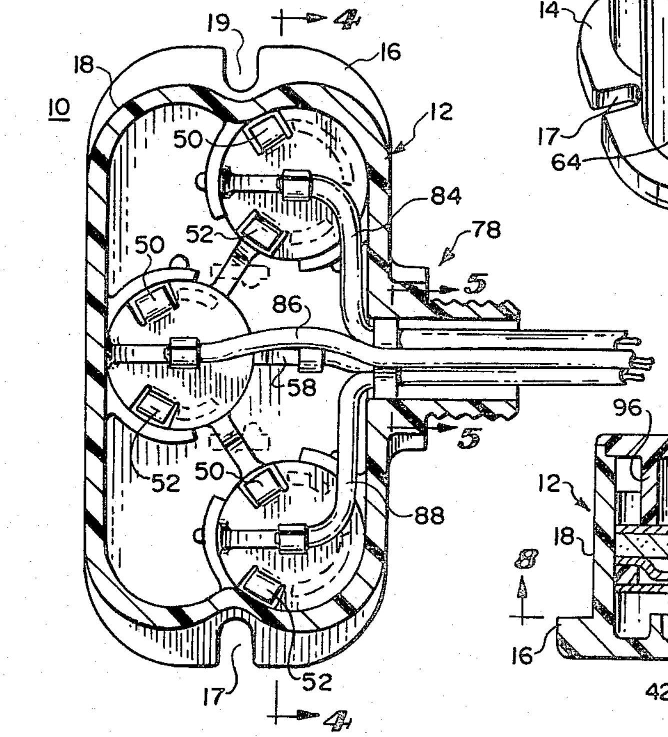
FIG. 3 is a sectional view of the secondary valve arrester of FIG. 1 taken along the line 3—3 thereof.

The lower-most wire lead 76, as illustrated in the drawings, extends outwardly of the housing via the lower passage. Wire leads 84, 86, 88 connected to each of the three second connecting electrodes, extend through the remaining three respective passages formed in the conduit as shown in FIG. 4, outwardly of the arrester housing. As is best illustrated in FIG. 3 of the drawings, the female terminals 58 of the second connecting electrodes are bent to overlay the electrode body thereby to permit the wire leads 84, 86, 88, respectively to extend through conduit 78. The male terminals 50, 52 of the second electrode are not used.

Once the wire leads have passed through conduit 78 and extend outwardly thereof, epoxy resin or the like material is filled into the four passages of the conduit, sealing the housing and retaining the wire leads in position. The crossribs 114, 116 defining th four passages also serve to retain the epoxy resin within the conduit. The alternative internal structure 79 which forms lead holes 80 and 81 and knockout diaphrams 82 and 83 also serves to retain the expoxy resin within the conduit.

As explained heretofore, the surge arrester according to the invention may be employed in the protection of electrical systems of differing voltages merely by the substitution of valve blocks 72 of a first thickness for ones of differing thickness. To accommodate such substitution, yet still maintain the respective valve block and spark gap assemblies stacked tightly in respective compartments 30, 32, 34, lid 20 of the housing is provided with first and second rib arrangements 90, 92, respectively, either of which, upon placement of the lid on the open end of the housing base portion 14, will be aligned with valve block and spark gap assembly compartments 30, 32, 34, respectively. First rib arrangement 90 of lid 20 comprises three sets 96, 98, 100 of curved upstanding rib members extending outwardly from the outside surface 94 of the lid 20 (FIG. 11).

Second rib arrangement 92 of lid 20 comprises three separate sets 102, 104, 106 of curved, upstanding rib members extending outwardly from the outside surface 94 of the lid 20 (FIG. 11). The rib sets, 96, 98, 100 of rib arrangement 90 as can be seen in the drawings are longer than rib sets 102, 104, 106, respectively of rib arrangement 92. Accordingly, in the case where a relatively low voltage electrical system; i.e. 250 volts, is being protected by the arrester according to the invention, relatively thin valve blocks 72 (FIG. 6) are employed and lid 20 is oriented so that rib sets 96, 98, 100, are aligned with respective compartments 30, 32, 34. On the other hand, when a relatively high voltage electrical system; i.e. 650 volts, is to be protected by the surge arrester 10, valve blocks 72 (FIG. 7) of greater thickness are employed in the arrester. In this case, lid 20 is rotated 180 degrees to align shorter rib sets 102, 104, 106, with compartments 30, 32, 34, respectively to retain the corresponding valve block and spark gap assemblies in a tightly stacked condition therein.

In addition to the rib arrangements 90, 92 formed on the inside surface 94 of lid 20, a pair of descending separator arms 110, 112 extend from inside surface 94 of the lid between compartments 30, 32, and 32, 34, respectively of the housing. Regardless of the orientation of lid 20, separater arms 110, 112 will remain in the same relative position with regard to the housing compartments. The purpose of the downwardly extending separator arms is to electrically insulate the respective valve block and spark gap assemblies from one another in the housing.

Thus, as can be seen, the surge arrester 10 according to the invention can be employed for single, two or three phase electrical system protection as well as for variety of voltage levels in such systems. The electrodes 48 comprising both first and second connecting electrodes of the arrester are identical in structure, providing for a minimum of components required in the arrester. Furthermore, the button electrode including the dielectric material comprising chromium, aluminum or the like oxide to produce an improved impulse spark over characteristic, insures quick dissipation of any lightning or high voltage surges occuring in the electrical system being protected by the arrester 10.

While a particular embodiment of the invention has been shown and described, it should be understood that the invention is not limited thereto as many modifications thereof may be made. It is therefore contemplated to cover by the present application, any and all such modifications as fall within the true spirit and scope of the appended claims.

I claim:

1. A valve arrester, including in combination:

a housing comprising an open ended base portion having base wall means and upstanding side wall means extending from said base wall means, lid means for receipt on the free end of said side wall means for closing off the open end of said base portion, at least one valve block and spark gap assembly, predeterminedly shaped compartment means defined in said base portion for receiving said valve block and spark gap assembly, said valve block and spark gap assembly including first and second connecting electrodes, valve block means and spark gap means, said valve block means and spark gap means being positioned between said first and second connecting electrodes, lead means joined to said first and second connecting electrodes and extending outwardly of said housing, said lid means including first and second rib arrangements extending therefrom into said base portion, one of said first and second rib arrangements being of a greater length than the other of said first and said second rib arrangements, the first one of said rib arrangements for engaging said valve block and spark gap assembly when a valve block means of a first thickness is included in said valve block and spark gap assembly and the second of said rib arrangements for engaging said valve block and spark gap assembly when a valve block means of a second thickness is included in said valve block and spark gap assembly, said first rib arrangement being aligned with said valve block and spark gap assembly upon receipt of said lid means on said open end of said base portion in a first orientation with respect thereto and said second rib arrangement being aligned with said valve block and spark gap assembly upon receipt of said lid means on said open end of said housing in a second orientation with respect thereto.

2. A valve arrester as defined in claim 1 wherein said base portion includes three of said predeterminedly shaped compartment means.

3. A valve arrester as defined in claim 1 further comprising conduit means extending outwardly from said upstanding side wall means, said conduit means including internally defined structure means, said structure means forming a plurality of passages through which said lead means extend outwardly of said housing.

4. A valve arrester as defined in claim 3 further including means received in said passages of said conduit means for sealing said conduit means and for retaining said lead means in position therein.

5. In a valve arrester comprising a housing defining at least one predeterminedly dimensioned compartment, at least one valve block and spark gap assembly for receipt in said compartment, and lead means connected to said valve block and spark gap assembly, said valve block and spark gap assembly including a conductive spark gap connecting electrode and a resistive valve block, the improvement wherein said conductive spark gap connecting electrode comprises;

a flat body, at least one offset male terminal and at least one offset female terminal, said flat body defining a central aperture for gas dissipation therethrough, said offset female terminal having a free end for connection to one of said lead means and an offset male terminal of another one of said spark gap connecting electrodes, said offset female terminal being bendable to extend outwardly from said flat body for connection to one of said lead means and a male terminal of another one of said spark gap connecting electrodes and being bendable to overlay said flat body for connection to said lead means.

6. In a valve arrester as defined in claim 5 wherein the free end of said offset female terminal is bendable to form a sleeve for receipt of one of said lead means and said offset male terminal of another one of said spark gap connecting electrodes.

7. In a valve arrester as claimed in claim 5, said conductive spark gap connecting electrode further comprising a second offset male terminal for receipt by a female terminal, therein permitting connection of said conductive spark gap connecting electrode to as many as two other of said conductive spark gap connecting connecting electrodes.

8. In a valve arrester comprising a housing defining at least one predeterminedly dimensioned compartment, at least one valve block and spark gap assembly for receipt in said compartment, and lead means connected to said valve block and spark gap assembly, said valve block and spark gap assembly including a spark gap connecting electrode and a spark gap intermediate electrode having an improved impulse spark over characteristic, said spark gap intermediate electrode including a central convex portion, the outer surface of said convex portion having a dielectric material affixed thereto, said spark gap connecting electrode including a flat body, at least one offset male terminal and at least one offset female terminal, said flat body defining a central aperture for gas dispersion therethrough, said offset female terminal having a free end for connection to one of said lead means and said offset male terminal of another one of said spark gap connecting electrodes.

9. In a valve arrester as claimed in claim 8 wherein the outer surface of said central convex portion of said spark gap electrode includes chromium oxide affixed thereto.

10. In a valve arrester as claimed in claim 8 wherein the outer surface of central convex portion of said spark gap electrode includes aluminum oxide affixed thereto.

11. In a valve arrester comprising a housing defining at least one predeterminedly dimensioned compartment, at least one valve block and spark gap assembly for receipt in said compartment, and lead means connected to said valve block and spark gap assembly, said valve block and spark gap assembly including two disk shaped conductive spark gap connecting electrodes, one at each end of said valve block assembly, each said spark gap connecting electrode having a flat body, at least one offset male terminal and at least one offset female terminal, said flat body defining a central aperture for gas dissipation therethrough, said offset female terminal having a free end for connection to one of said lead means and an offset male terminal of another one of said spark gap connecting electrodes, said offset female terminal being bendable to extend outwardly from said flat body for connection to one of said lead means and said male terminal of another one of said spark gap connecting electrodes and being bendable to overlay said flat body for connection to said lead means, a disk shaped valve block, a ring shaped insulating spacer means adjacent said valve block, said ring shaped insulating spacer means defining a central, predeterminedly sized aperture, a spark gap electrode having an improved impulse spark over characteristic positioned between said spacer means and valve block, said spark gap electrode comprising a central convex portion dimensioned to fit within said centrally located predeterminedly sized aperture of said ring shaped insulating spacer means, the surface of said convex portion of said spark gap electrode opposite said valve block having a dielectric material affixed thereto.

12. In a valve arrester as claimed in claim 11 wherein the outer surface of said convex portion of said spark gap electrode includes chromium oxide affixed thereto.

13. In a valve arrester as claimed in claim 11 wherein the outer surface of said convex portion of said spark gap electrode includes aluminum oxide affixed thereto.

14. In a valve arrester as claimed in claim 11 wherein said valve block assembly further includes helical spring means positioned at one end of said valve block assembly for biasing said valve block component into contacting engagement, thereby to provide good electrical connection therebetween.

15. In a valve arrester as claimed in claim 11 a housing further including three predeterminedly shaped compartment means defined in said base portion for receiving up to three of said valve block and spark gap assemblies, lid means including first and second rib arrangements extending therefrom into said base portion, one of said first and second rib arrangements being of a greater length than the other of said first and second rib arrangements, the shorter of said rib arrangements for engaging valve block and spark gap assemblies including valve block means of a first predetermined thickness included in said compartment and the longer of said rib arrangements for engaging valve block assemblies including valve block means of a second thickness included in said compartment means.

16. In a valve arrester as claimed in claim 11, a valve block and spark gap assembly having a cylindrical shape, a housing comprising an open ended base portion having a base wall means and upstanding side wall means extending from said base wall means, cylindrical compartment means defined in said base portion dimensioned for receiving said valve block and spark gap assembly, said valve block and spark gap assembly further including helical spring means, cylindrically shaped receptable means centrally located within said compartment means for receiving said helical spring means, lid means for receipt on the free end of said side wall means for closing off the open end of said base portion, said lid means including first and second rib arrangements extending therefrom into said compartment means, one of said first and second rib arrangements being of a greater length than the other of said first and said second rib arrangements, the shorter of said rib arrangements for engaging said cylindrically shaped valve block and spark gap assembly when a valve block of a first thickness is included in said cylindrically shaped valve block and spark gap assembly and the longer of said rib arrangements for engaging said cylindrically shaped valve block and spark gap assembly when a valve block of a second thickness is included in said cylindrically shaped valve block and spark gap assembly, said first rib arrangement being aligned with said cylindrically shaped valve block and spark gap assembly upon receipt of said lid means on said open end of said base portion in a first orientation with respect thereto and said second rib arrangement being aligned with said cylindrically shaped valve block and spark gap assembly upon receipt of said lid means on said open end of said housing in a second orientation with respect thereto.

* * * * *